(12) United States Patent
DeBenedictis et al.

(10) Patent No.: US 7,557,975 B2
(45) Date of Patent: Jul. 7, 2009

(54) HIGH SPEED, HIGH EFFICIENCY OPTICAL PATTERN GENERATOR USING ROTATING OPTICAL ELEMENTS

(75) Inventors: Leonard C. DeBenedictis, Palo Alto, CA (US); C. David Nabors, Sunnyvale, CA (US); George Frangineas, Fremont, CA (US)

(73) Assignee: Reliant Technologies, Inc., Mountain View, CA (US)

( * ) Notice: Subject to any disclaimer, the term of this patent is extended or adjusted under 35 U.S.C. 154(b) by 0 days.

(21) Appl. No.: 11/952,925

(22) Filed: Dec. 7, 2007

(65) Prior Publication Data

US 2008/0088901 A1 Apr. 17, 2008

Related U.S. Application Data

(60) Division of application No. 11/679,117, filed on Feb. 26, 2007, now Pat. No. 7,411,711, which is a continuation of application No. 10/750,790, filed on Dec. 31, 2003, now Pat. No. 7,184,184.

(51) Int. Cl.
G02B 26/08 (2006.01)
(52) U.S. Cl. ..................................... 359/212.1
(58) Field of Classification Search ......... 359/212–216, 359/201.1, 201.2
See application file for complete search history.

(56) References Cited

U.S. PATENT DOCUMENTS

| | | | |
|---|---|---|---|
| 3,619,033 A | 11/1971 | McMahon | |
| 3,721,486 A | 3/1973 | Bramley | |
| 4,113,367 A | 9/1978 | Fritzler | |
| 4,289,371 A | 9/1981 | Kramer | |
| 4,387,952 A | 6/1983 | Slusher | |
| 4,428,643 A | 1/1984 | Kay | |
| 4,923,262 A | 5/1990 | Clay et al. | |
| 5,018,803 A | 5/1991 | Hecker et al. | |
| 5,182,659 A | 1/1993 | Clay et al. | |
| 5,309,272 A | 5/1994 | Harris | |
| 5,501,680 A | 3/1996 | Kurtz et al. | |
| 5,646,764 A | 7/1997 | Moore et al. | |
| 5,906,609 A | 5/1999 | Assa et al. | |
| 6,436,127 B1 | 8/2002 | Anderson et al. | |
| 6,493,570 B1 | 12/2002 | Dees et al. | |
| 6,951,558 B2 | 10/2005 | Angeley et al. | |

(Continued)

FOREIGN PATENT DOCUMENTS

CN 1432142 A 7/2003

(Continued)

OTHER PUBLICATIONS

U.S. Appl. No. 60/458,770, filed Mar. 27, 2003, 36 pages.

(Continued)

Primary Examiner—Euncha P Cherry
(74) Attorney, Agent, or Firm—Fenwick, West LLP

(57) ABSTRACT

An optical pattern generator includes one or more multi-faceted rotating optical elements that introduce an offset that is rotation insensitive. The component that generates the offset is rotationally symmetric around the rotational axis of the optical element. Thus, as the optical element rotates, the effect of the offset component does not change. In addition, rotating optical elements may be designed to counteract unwanted optical effects of each other.

14 Claims, 9 Drawing Sheets

U.S. PATENT DOCUMENTS

| | | |
|---|---|---|
| 7,184,184 B2 | 2/2007 | DeBenedictis et al. |
| 7,196,831 B2 | 3/2007 | Broome et al. |
| 2003/0032950 A1 | 2/2003 | Altshuler et al. |
| 2003/0216719 A1 | 11/2003 | DeBenedictis et al. |
| 2004/0082940 A1 | 4/2004 | Black et al. |
| 2005/0049582 A1 | 3/2005 | DeBenedictis et al. |

FOREIGN PATENT DOCUMENTS

| | | |
|---|---|---|
| WO | WO 99/11324 A1 | 3/1999 |
| WO | WO 01/23032 A2 | 4/2001 |
| WO | WO 01/26573 A1 | 4/2001 |
| WO | WO 02/1298 A1 | 1/2002 |
| WO | WO 2004/069325 A2 | 8/2004 |
| WO | WO 2005/016453 A1 | 2/2005 |

OTHER PUBLICATIONS

U.S. Appl. No. 10/745,761, filed Dec. 23, 2003, 33 pages.
Chinese Notification of 1st Office Action, CN 200480039511.9, Jul. 20, 2007, 31 pages.
Chinese Office Action, Chinese Application No. 200480040946.5, May 9, 2008, 20 pages.
Chinese $2^{nd}$ Office Action, Chinese Application No. 200480040946.5, Jan. 9, 2009, 3 pages.
European Examination Report, European Application No. 04815755.6, Oct. 26, 2006, 5 pages.
European Summons to Attend Oral Proceedings, European Application No. 04815755.6, Dec. 5, 2008, 4 pages.
PCT International Search Report and Written Opinion, PCT/US2004/043749, Jun. 8, 2005, 16 pages.
PCT International Preliminary Report on Patentability, PCT/US2004/043749, Jul. 6, 2006, 11 pages.

HIGH SPEED, HIGH EFFICIENCY OPTICAL PATTERN GENERATOR USING ROTATING OPTICAL ELEMENTS

CROSS-REFERENCE TO RELATED APPLICATION(S)

This application is a divisional of U.S. patent application Ser. No. 11/679,117, "High Speed, High Efficiency Optical Pattern Generator Using Rotating Optical Elements," filed Feb. 26, 2007, by Leonard C. DeBenedictis, et al., which is a continuation of U.S. patent application Ser. No. 10/750,790, "High Speed, High Efficiency Optical Pattern Generator Using Rotating Optical Elements," filed Dec. 31, 2003 by Leonard C. DeBenedictis, et al. The subject matter of all of the foregoing is incorporated herein by reference in their entirety.

BACKGROUND OF THE INVENTION

1. Field of the Invention

This invention relates generally to optically generating a pattern of figures, such as an array of spots or an array of scan lines. More particularly, this invention relates to generating such patterns using multi-faceted rotating optical elements.

2. Description of the Related Art

The optical generation of a pattern of spots or scan lines is used in a variety of applications. Digital copiers, printers, fingerprint identification, hand-held bar code scanners, industrial applications, light show entertainment, displays, telecommunications switching and medical applications are a few examples. Perhaps the most common mechanisms for generating patterns of figures are tilting mirrors (e.g., oscillating mirrors driven by galvanometers) and reflections from rotating polygons.

However, optical pattern generators based on tilting mirrors typically have characteristics that make them unsuitable for certain applications. For example, scanning in these systems is typically achieved by tilting a mirror back and forth. But back and forth motion requires that the mirror come to a stop and then reverse direction. This takes time, which limits the scan rate. In order to increase the scan rate of these systems, the mirror often is driven with an oscillating motion at a rate that is near its resonant frequency. However, this severely restricts the patterns that can be generated. For example, it is difficult to generate irregular patterns since the mirror motion is constrained to be oscillatory. The near-resonance condition also limits the range of scan rates that can be achieved. For example, it is difficult to tune such a system over a wide range of scan rates since the near-resonance condition cannot be met over a wide range. If a two-dimensional pattern is desired (e.g., a series of parallel scan lines or a two-dimensional pattern of spots), then typically either a single mirror is tilted in two directions simultaneously or two coordinated, tilting mirrors are used. In many cases the efficiency of the utilization of light, such as laser light, is also important. The efficiency may be defined as the fraction of energy deposited in a desired pattern on the treatment surface compared to the total energy produced by the light source in a given period of time. If a pattern is sparse compared to the background, it is preferable to turn off the light source and scan quickly over the background, and then turn it back on when the light beam has settled over the spot to be exposed and expose the spots in the pattern in such a manner that the light source is efficiently utilized in time. This requires an even more responsive device that can accelerate, decelerate and settle quickly. As a result of these characteristics, galvanometer-based systems are not well suited for high speed pattern generation, particularly if the pattern is an irregular or a sparse one.

In the rotating polygon approach, the sides of a three-dimensional polygon are mirrored and the polygon is rotated about a center axis. As each mirrored side rotates through an incident optical beam, the optical beam is reflected to generate a point on a scan line. The rotation of each mirrored side through the optical beam produces one scan line. If all of the mirrored sides are the same (e.g., make the same pyramid angle with the base of the polygon), then the same scan line is traced over and over. If the mirrored sides are different, then different scan lines can be traced as each side rotates through the optical beam. For example, by varying the pyramid angle of each side, the reflected optical beam can trace a series of scan lines.

However, the rotating polygon approach also has drawbacks that make it unsuitable for certain applications. For example, systems that produce a series of scan lines can suffer from aberrations due to the rotation. In order to trace a series of scan lines, each side has a different pyramid angle that offsets the basic scan line in a direction that is perpendicular to the scan direction. However, as each side rotates through the optical beam, the orientation of the angled side is also rotated. This can cause changes in the amount of offset and/or other unwanted aberrations. One example is scan line bow. The ideal scan line is generally a straight line segment but the actual scan line is often an arc segment. The sag of the arc segment is the bow. In the case of rotating polygon scanners, sides that have non-zero pyramid angles generate bowed scan lines. The amount of bowing depends on the pyramid angle. In a polygon scanner where different pyramid angles are used to trace multiple scan lines or to generate spots at different locations, not only will each scan line be bowed, but the bow will vary from one scan line to the next. The difference between the bow of the top-most scan line and the bottom-most scan line can be significant.

Scan line bow and other effects caused by rotation can cause additional problems, depending on the application. For example, in some applications, the scanning action is used to compensate for motion of the scanner relative to a target so that the optical beam ideally remains at a fixed spot on the target even though the scanner is moving relative to the target. In this case, scan line bow will cause the optical beam to move in the direction perpendicular to the scan direction. If this motion is slow compared to the dwell time of the optical beam on the target, then the bow effectively introduces an unwanted motion in the perpendicular direction. If the motion is fast relative to the dwell time of the optical beam on the target, then the bow, which is a radial deflection, when combined with the uncompensated tangential motion, effectively blurs the optical beam, increasing the spot size of the beam on the target. Typically, neither effect is desirable.

Thus, there is a need for optical pattern generators than can operate at high speeds, particularly for the generation of irregular patterns. There is also a need for pattern generators with reduced aberrations and/or blurring.

SUMMARY OF THE INVENTION

The present invention overcomes the limitations of the prior art in a number of ways. In one aspect, one or more multi-faceted rotating optical elements introduce an offset that is rotation insensitive. The component that generates the offset is rotationally symmetric around the rotational axis of the optical element. Thus, as the optical element rotates, the effect of the offset component does not change.

In another aspect, two or more multi-faceted rotating optical elements are used to counteract unwanted effects produced by each other. In one example, one rotating optical element introduces a deflection but also some unwanted optical power. A second rotating optical element counteracts the optical power while reinforcing the deflection. The result is a deflected beam with no additional optical power. In another example, the rotating optical elements generate scan lines and the scan line bow introduced by one rotating optical element counteracts the bow introduced by other rotating optical elements, while reinforcing the desired scan.

In one embodiment, an optical pattern generator includes a multi-faceted rotating optical element having a plurality of facets. Each facet causes an incident optical beam to generate a figure (e.g., a spot or a scan line) as the facet rotates through the optical beam. The facets together generate an array of figures. One or more facets include an offset component that is substantially rotationally symmetric and substantially centered on the rotational axis of the rotating optical element. The offset component offsets the figure along an offset direction, which is generally aligned with a radial direction of the rotating optical element. In one implementation, different facets offset the figures by different amounts. The facets can be arranged so that the figures are offset by uneven amounts and/or generated in a non-sequential order. In some embodiments, the figure can be more complex than a spot or a scan line and the figure can vary over time. In addition, the pattern generator can be combined with another motion or scanning mirror. The resulting pattern can be a changing two-dimensional image, such as in a video display.

In a particular design, there are two counter-rotating scan disks with one-to-one correspondence of facets. For at least one pair of corresponding facets, the facets on both scan disks include an offset component as described above. The offset components are implemented as a positive lens-like element on one scan disk and a negative lens-like element on the other scan disk. In some applications, the powers of the lens-like elements vary from facet to facet, with different facets introducing different offsets. The facets may also include scan components to generate a scan line, for example with the scan component on one facet introducing a bow that counteracts the bow introduced by the scan component on the other facet.

In another aspect, an optical pattern generator deflects an optical axis along an array of scan lines. The optical pattern generator includes two multi-faceted rotating optical elements, with one optical element located downstream of the other. The two rotating optical elements are counter-rotating and have corresponding facets. The facets cause the optical axis to deflect along a scan line as the facets rotate through the optical axis. The optical elements may also implement bow correction and/or offset of scan lines, as described above. This type of pattern generator can be used in many different applications, including both systems that generate optical figures and imaging systems.

In another aspect, different devices include various combinations of the offset functions, scan line functions and counteracting principles described above. In some embodiments, rotating optical elements are combined with conventional scanners. Other aspects of the invention include methods corresponding to the devices described above, and applications for all of the foregoing, including for example using the scan lines to compensate for motion.

BRIEF DESCRIPTION OF THE DRAWINGS

The invention has other advantages and features which will be more readily apparent from the following detailed description of the invention and the appended claims, when taken in conjunction with the accompanying drawings, in which:

DETAILED DESCRIPTION OF THE PREFERRED EMBODIMENTS

Figure 1A:
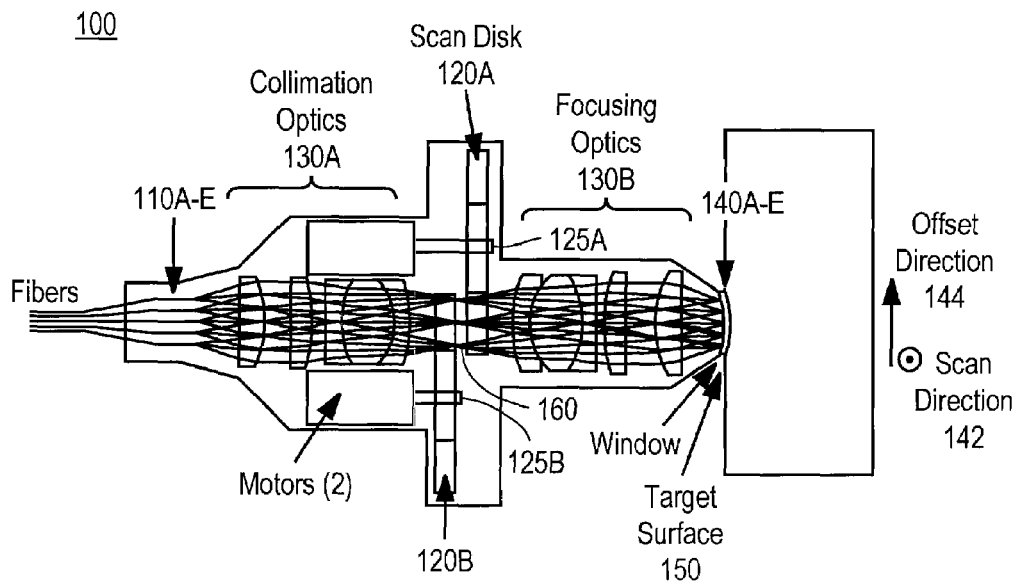
FIG. 1A is a side cross section of an optical pattern generator according to one aspect of the invention.
Figure 1C:
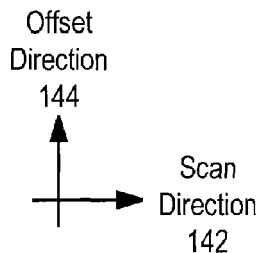
FIG. 1C is a diagram illustrating offset of scan lines.
Figure 1C:
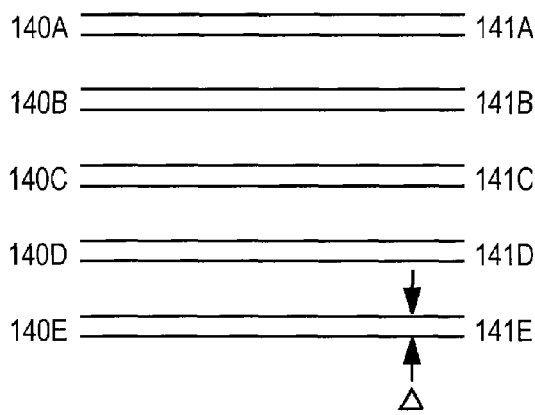
Figure 1B:
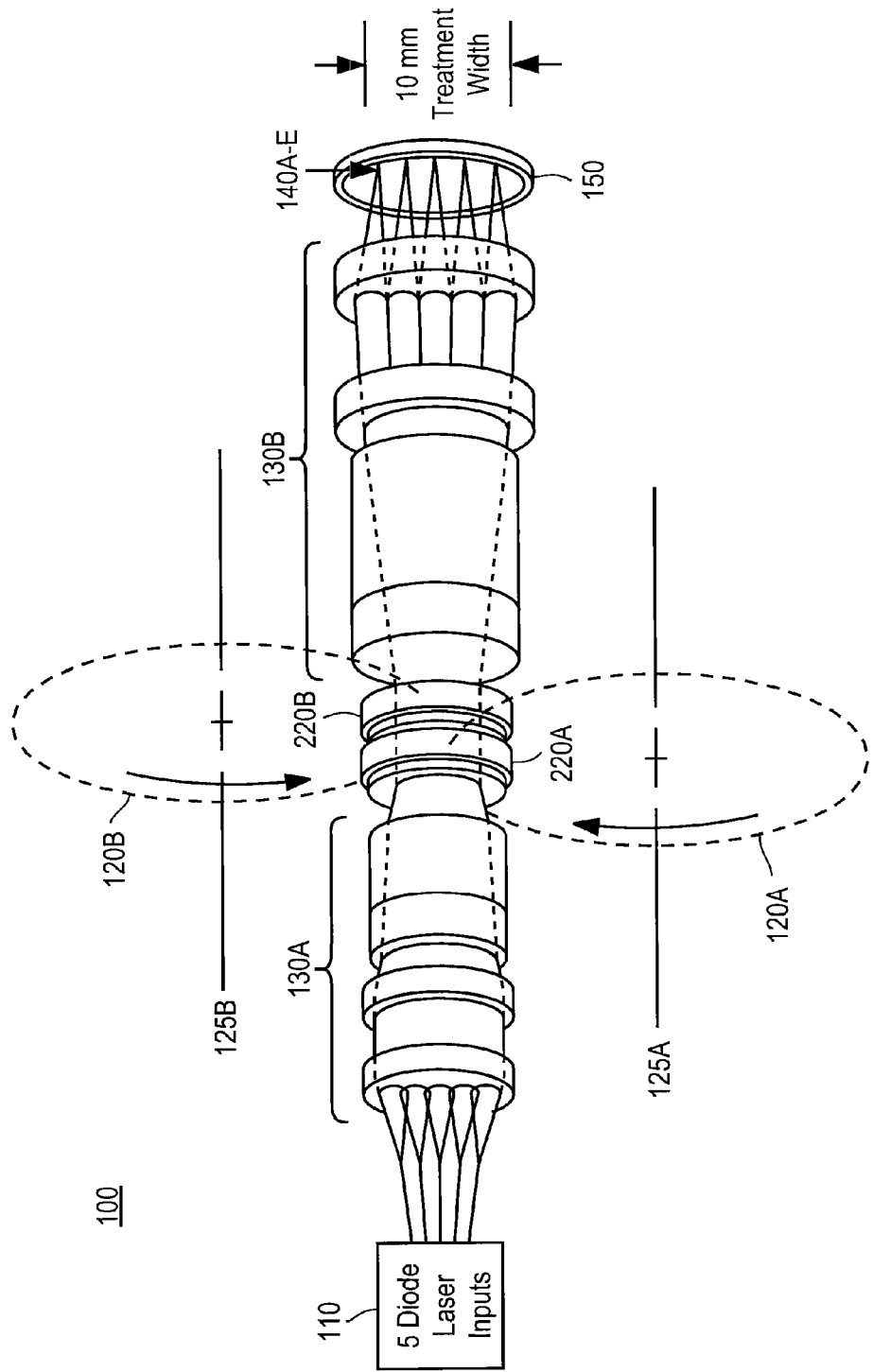
FIG. 1B is a perspective view of the optical train of the pattern generator of FIG. 1A.

FIGS. 1A-1C illustrate one example of an optical pattern generator 100 according to the invention. The optical train of the pattern generator 100 includes one or more optical sources 110A-E and one or more multi-faceted rotating optical elements 120A-B. It may also include additional optics 130A-B for shaping the optical beam(s) as they pass through the optical train to the target surface 150.

The optical source 110 produces an optical beam(s) that is incident upon the rotating optical elements 120. Each rotating optical element 120 has a number of facets, and facets on one rotating optical element 120 have corresponding facets on the other optical elements 120. The rotation of the optical elements 120 is synchronized so that corresponding facets rotate through the incident optical beam in synchronization.

The optical beams generate FIGS. 140A-E on the target surface 150 as the facets rotate through the optical beams. In this example, the FIGS. 140A-E are scan lines, although they can be spots or other shapes in alternate embodiments. In FIG. 1A, the scan direction 142 is in and out of the paper. The facets also offset the scan lines 140 in a direction 144 perpendicular to the scan direction 142. For example, referring to FIG. 1C, one set of corresponding facets on the scan disks may produce the set of scan lines 140A-E, with each of the five scan lines traced by the corresponding optical beam. The next set of corresponding facets may produce the scan lines 141A-E, which is offset by an amount Δ relative to the scan lines 140.

For convenience, the portions of the facets that cause the optical beams to trace the scan lines shall be referred to as scan components and the portions that cause the offset of the scan lines shall be referred to as offset components. These may be implemented as physically distinct components, for example the scan component can be attached to one side of the optical element 120 and the offset component to the reverse side. Alternately, they may be integrated into a single component. For example, a general asphere may be used, with the asphere implementing both the scanning and the offset functions. Alternatively, the scanning and offset functions can be generated by a spherical surface that has its axis of symmetry slightly displaced from the axis of rotation of the disk to which it has been mounted. In addition, this example pattern generator has both scanning and offset, but alternate embodiments may utilize only scanning or only offset.

In the specific example shown in FIG. 1, five optical fibers are used as the optical sources 110. Collimation optics 130A collimate the optical beams from the five fibers. Two scan disks 120A-B are located in close proximity to plane 160, one on each side of the plane. Plane 160 is where the chief rays of the five optical beams cross. The rotational axes 125 of the scan disks are located on opposite sides of the optical beams. The scan disks 120 are counter-rotating (i.e., if one rotates clockwise, the other rotates counter-clockwise) so that corresponding facets generally travel together as they rotate through the optical beam. Focusing optics 130B refocus the deflected collimated beams to spots on the target surface 150. The spots trace out scan lines 140 due to the scanning action of the facets, and the scan lines are offset due to the offset action of the facets. Motors rotate the scan disks 120.

Figure 2:
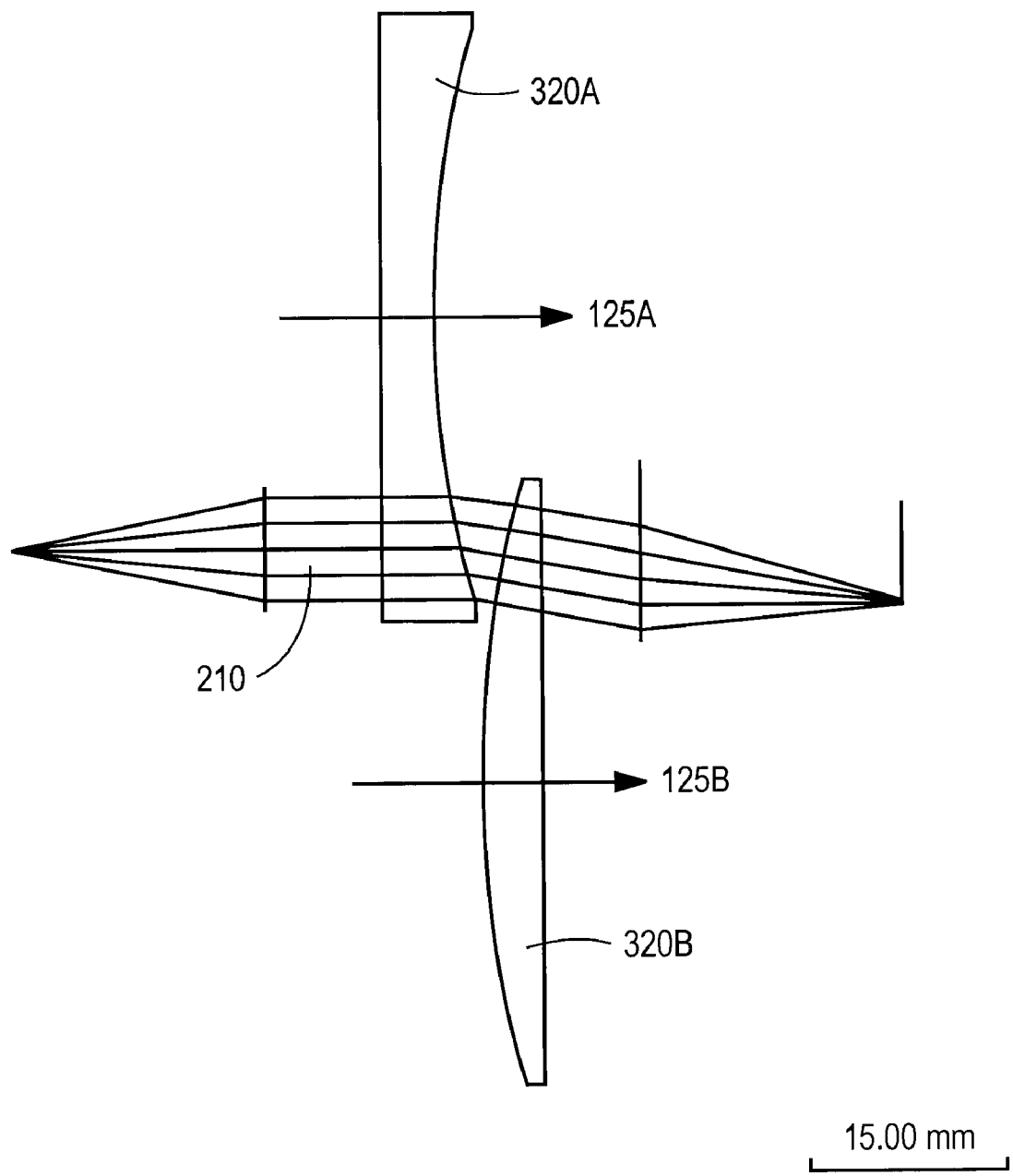
FIG. 2 is a ray trace through two offset components.

FIG. 2 illustrates the offset component of the facets. In a conventional approach, the offset component that generates the offset may be a prism. However, as the scan disk rotates, the prism also rotates and this can introduce unwanted effects, such as unintentional scanning of the optical beam. To avoid this effect, the offset components in this example are rotationally symmetric about the rotational axis of the respective optical element 120. Then, when the optical element 120 rotates, there is no change in the optical effect of the offset component. One example of such an offset component is a portion of a sphere, where the axis of the sphere is aligned with the rotational axis of the scan disk. Spheres with a shorter radius result in a greater offset of the spherical surface at the centerline of the optical beam.

FIG. 2 illustrates a specific example of a rotationally symmetric offset component. In this case, the offset components on the two scan disks 120A-B are lenses 320 centered about the respective rotational axes 125A-B of the scan disks. The offset components have optical powers that are equal in magnitude but opposite in sign, and the optical beam 210 is located midway between the two rotational axes 125. In FIG. 2, the offset component 320A is a lens with negative (divergent) optical power and offset component 320B is a lens with positive power.

Due to the diverging nature of the lens 320A, after passage through this lens, the light appears to radiate from a point source located on the rotational axis of the lens (which in this case is also the rotational axis 125A of the scan disk). Since the optical beam 210 has a small diameter relative to the lens 320A, this effect is primarily a deflection of the optical beam 210 away from the rotational axis 125A. In addition, the individual light rays in the optical beam begin to diverge away from each other and, if allowed to propagate a long distance, the optical beam would begin to broaden. However, the optical beam very soon reaches the second offset component 320B, which has an optical power that is very nearly equal and opposite to that of the first. The optical beam emerges essentially collimated. In addition, since the rotational axis 125B of the positive lens 320B is on the opposite side of the optical beam as the axis 125A for the negative lens 320A, the deflection imparted by the second lens 320B adds to the deflection imparted by the first lens 320A. The net result is that the incoming collimated beam leaves the two scan disks 120 still collimated but deflected by a certain amount. Furthermore, this amount of deflection and the shape of the outgoing beam do not change as the scan disks 120 rotate since the offset components are rotationally symmetric about the axes of rotation.

FIG. 2 shows the lenses 320A and 320B as entire lenses. This was done for illustrative purposes. In the actual implementation, each lens 320 does not cover the entire scan disk 120. Rather, each lens covers a facet on the scan disk. Different facets can use lenses of different powers. For example, one pair of corresponding facets may contain a strong positive lens and a strong negative lens, thus causing a strong deflection. The next pair of corresponding facets may contain a weaker positive lens and a weaker negative lens, thus causing a weaker deflection. As the different pairs of facets rotate through the incident optical beam, the beam is deflected by different amounts due to the different optical powers in the lenses. However, the beams all emerge collimated. Thus, focusing optics can be used to focus the emerging beams onto a flat target field.

Figure 3A:
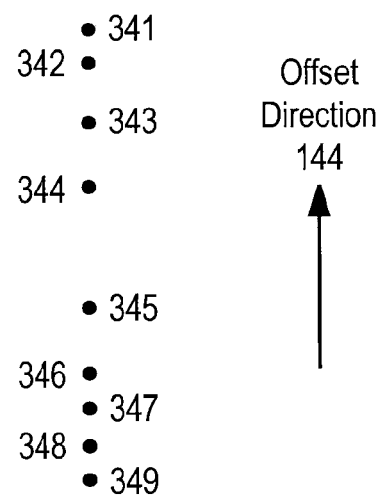
FIG. 3A is a diagram illustrating an offset pattern.
Figure 3B:
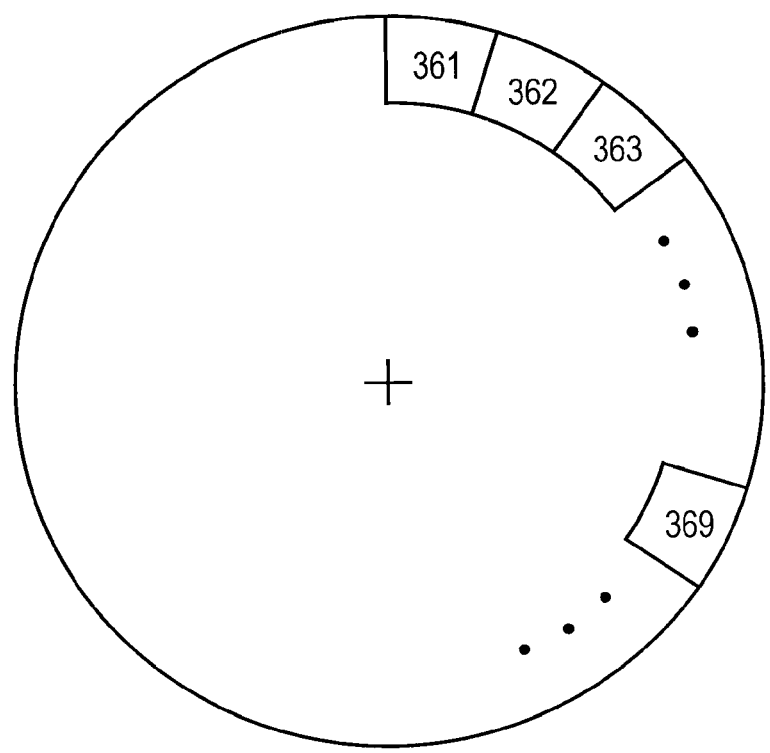
FIG. 3B is a top view of a scan disk used to generate the offset pattern of FIG. 3A.

The use of multi-faceted rotating optical elements to implement the offset has significant advantages, some of which are illustrated in FIGS. 3A-3B. FIG. 3A shows the offsets 341-349 to be generated. Note that FIG. 3A is a depiction of the offset pattern. If the figures generated by the system are spots, then an array of offset spots will be generated. If the figures are scan lines, then an array of offset scan lines will be generated. If multiple optical beams are used (as in FIG. 1), then the basic pattern will be replicated. If a more complex object source which changes in time is used, the image of that source will be replicated and will change in time. FIG. 3B shows one of the pair of rotating optical elements used to generate these offsets. The rotating optical element has facets 361-369 and so on.

One advantage is that each offset 141-149 is generated by a corresponding pair of facets 361-369, but the facets can be designed independently of each other. Therefore, the offsets can be unevenly spaced, as shown in FIG. 3A. In addition, the figures can be generated in a non-sequential order. That is, it is not required that facet 361 generates offset 341, facet 362 generates offset 342, facet 363 generates offset 343, etc. Instead, facets 361-369 might generate offsets 341, 344, 347, 342, 348, 343, 345, 349, and 346, respectively. As the facets rotate through the optical beam, the figures will be generated in this non-sequential order. Figures can also be multiply exposed by adding corresponding facets. For example, facets 361, 364 and 367 might all generate offset 344. This characteristic allows the generation of irregular patterns. Irregular two-dimensional patterns can be generated by using two crossed systems, one causing deflection in the x direction and the other causing deflection in the y direction. Alternately, this approach can be combined with an ordinary galvanometer mirror or polygon mirror scanner to create two-dimensional patterns.

Another advantage is the speed of this approach. Disks can be rotated at very high speeds. For example, if a disk contains 30 facets and rotates at a speed of 10,000 rpm, then the system will generate 5,000 figures per second, if there is a single beam source. If the source has N beams, 5,000N figures per second will be generated. Furthermore, the speed can be varied over a wide range since there is no requirement to stay near a resonant frequency. In one approach, the drive shafts or the disks themselves are encoded and this feedback is used to both control the speed of the disks and to synchronize the disks with each other.

If the offset component is exactly rotationally symmetric and exactly centered on the rotational axis of the optical element, then the offset, which will be in the radial direction, will not vary as the offset component rotates through the optical beam. If there are no other components on the facet, then the system will generate an array of spots offset in the radial direction.

In many applications, however, it is advantageous to break the exact rotational symmetry. For example, a small amount of asymmetry may be added to the offset component in order to correct other aberrations. Alternately, the offset component may be slightly decentered from the rotational axis of the optical element, for example to introduce a scanning motion. Any scanning motion can be broken into a radial component and a tangential component. The symmetry in FIG. 2 allows the two disks to be designed so that the radial components from corresponding facets cancel and the tangential components reinforce. For example, if the two lenses 320A and 320B have the same (but opposite) power, they can be decentered by the same amount relative to their rotational axes 125, toward one another or away from one another. The result is a scan line that is purely in the tangential direction since the radial scan effects from the two lenses 320 cancel.

Figure 4A:
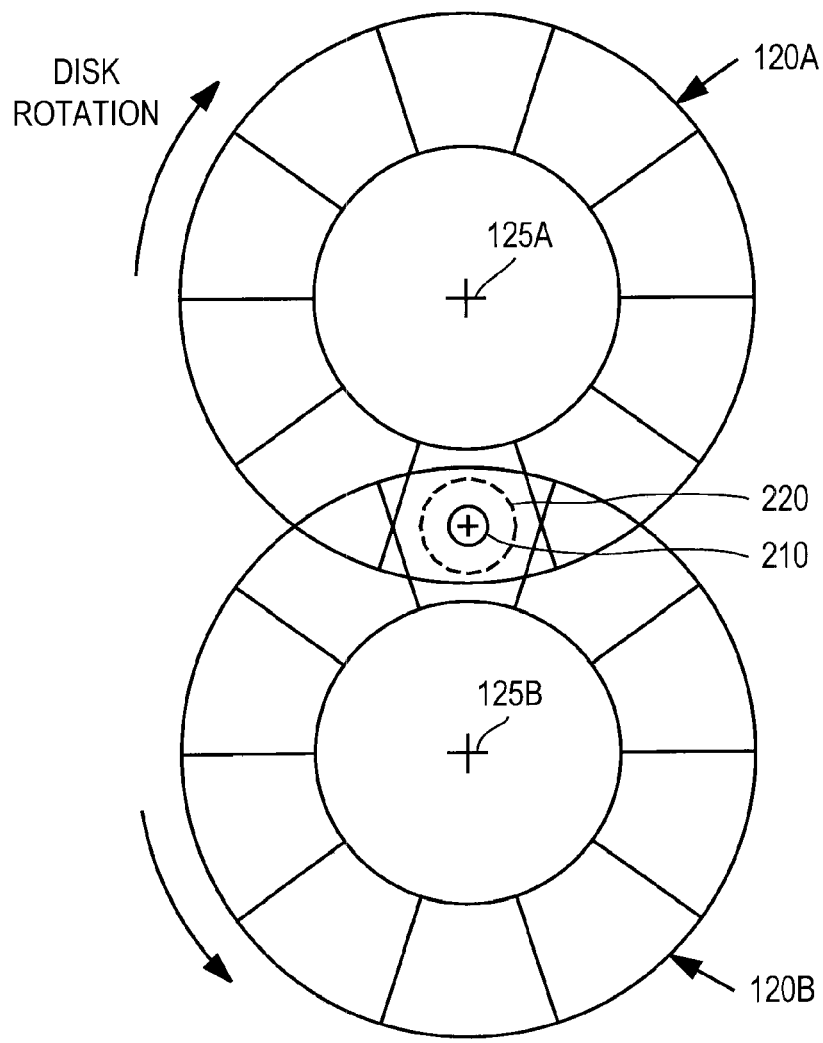
FIG. 4A is a top view of the rotating optical elements of the pattern generator of FIG. 1.
Figure 4B:
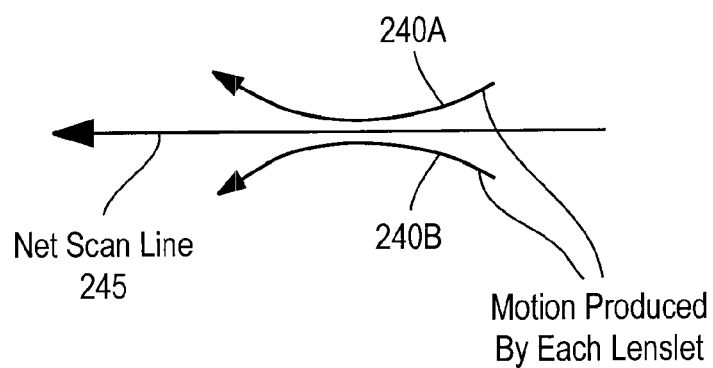
FIG. 4B is a diagram illustrating bow correction in a scan line produced by the rotating optical elements of FIG. 4A.

FIGS. 4A-4B further illustrate how facets can be designed so that their radial scan effects cancel. Scan components generally introduce a bow in the scan line as they rotate through the incident optical beam. In this case, while the scan component on each scan disk may introduce a bow, the two scan components are designed so that the different bows counteract each other and the overall bow is reduced or eliminated.

One example of a scan component is an off-center lens. In general, an off-center lens will produce a change in ray direction proportional to the amount of decenter. That is, $\Delta\theta = \delta x/f$ where $\Delta\theta$ is the change in ray direction, $\delta x$ is the amount of decenter and f is the focal length of the lens. Thus, a scan line can be created by moving a lens through an optical beam.

Referring to FIGS. 4A-4B, assume for the moment that there is only one scan disk 120A, that the optical beam 210 is normally incident to the scan disk 120A and that the scan component of the current facet has the same optical effect as a lens with positive optical power (negative power lenses can also be used), as represented by the circle 220. The circle representation is not meant to imply that the scan component must be circular in shape. For example, it may have the same shape of the facet. The optical beam is initially directed to the center of the circle 220. As the facet rotates through the optical beam 210, the center of the circle 220 also rotates about the rotational axis 125A. The resulting scan line follows the motion of the lens, tracing out an arc 240A as shown in FIG. 4B. The sag of the arc is the bow of this scan line.

This bow can be reduced, or even eliminated, as follows. If the scan component on scan disk 120B is also a lens with positive optical power, it will trace the arc 240B. But this arc is bowed in the opposite direction as arc 240A. The two bows counteract each other, resulting in a net scan line 245 that scans faster and is longer and with less bow. In some cases, the bow can be entirely eliminated. For example, this will be the case if the scan disks 120A-B are in close proximity to each other (so that propagation between the scan disks has negligible effect), the distance from the optical beam 210 to each rotational axis 125 is the same, and both scan components are lenses with the same optical power located in the same relative position on their respective facets.

Note that the offset generation and scan line generation were described above using specific examples. This was done for purposes of clarity and the invention is not limited to these examples. For example, it is not limited to either a single optical beam (e.g., FIG. 1 shows a case with five optical beams) or a single facet or exactly the same facet replicated over the entire scan disk. Each scan disk 120 contains multiple facets and each set of corresponding facets produces a figure (e.g., a spot or a scan line). If the facets on a scan disk are all the same, then the same figure will be repeated over and over with the same offset.

But the facets can also be different in order to produce different figures or figures with different offsets. For example, different scan components can be used on different facets in order to generate different lengths of scan lines. Similarly, different offset components (e.g., lenses with different optical power) can be used on different facets in order to generate different offsets. Furthermore, scan components and offset components can be combined in various ways to achieve different scan patterns. In addition, the bow correction and offset components described above need not be used with every facet. For example, a particular facet(s) may be designed for zero offset, in which case offset components are not necessary. Or there may be a set of N different offsets used for the entire pattern, with one of the N offsets being zero. In that case, a majority of facets but not all facets may utilize offset components. In some applications or for some facets, the undesirable effects introduced by conventional techniques may be tolerable so that bow correction and/or offset techniques are not necessary. At the other extreme, in some applications, every facet may utilize the bow correction and/or offset components described above.

The physical implementations of the scan component and offset component can also vary. For facets that include a separate scan component and offset component, different designs can place these components in different orders within the optical train. The scan component and offset component can also be integrated into a single optical component. For example, in the lens-based designs described above, the scan component is implemented as a lens centered at approximately the same radial location as the optical beam and the offset component is implemented as a lens centered on the rotational axis of the scan disk. To a first approximation, the net effect of these two lenses is the same as that of a single lens that has an optical power approximately equal to the sum of the optical powers of the scan component and the offset component and central axis that is located elsewhere. Thus, the two components can be implemented as a single lens. Although it is usually desirable for the incident beam and the beam exiting the counter rotating disks to be collimated, that is not a requirement for practical use, since the objective lens that focuses the exiting beam can be modified to accommodate power in the scanned beams. In some instances even different amounts of power from the different facet sets can be accommodated.

Furthermore, the examples shown above use transmissive facets but reflective or hybrid designs can also be used. The scan components and offset components can also be based on refraction, reflection, diffraction or a combination of these. Mirrors, conventional lenses, aspheres, Fresnel lenses, kinoforms, diffractive and holographic optics are examples of possible physical implementations. The term "lens-like optical element" will be used to refer to refractive lenses, curved mirrors, holographic lenses and other optical elements that are counterparts to refractive lenses.

Figure 5A:
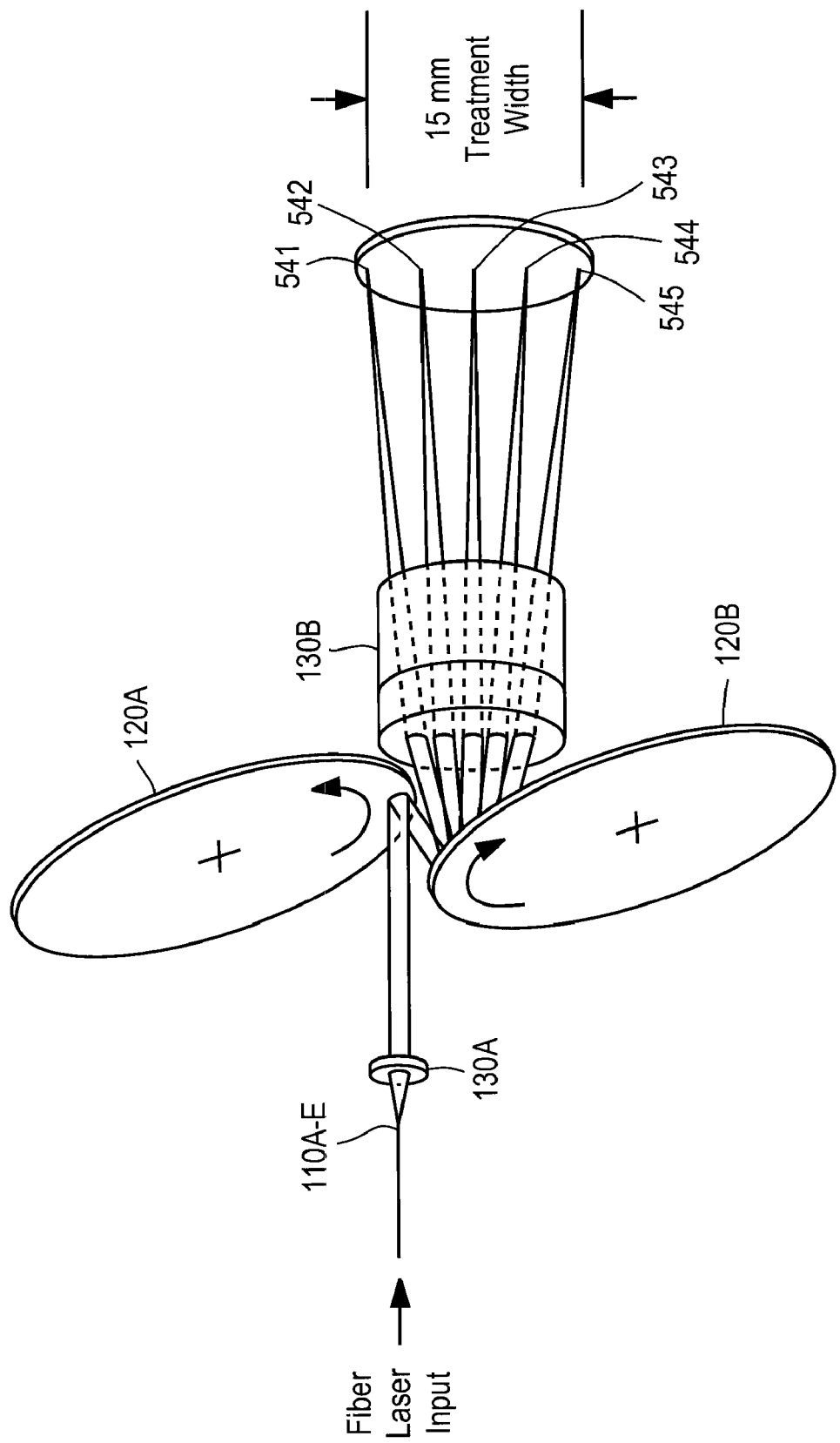
FIG. 5A is a perspective view of another pattern generator according to the invention.
Figure 5B:
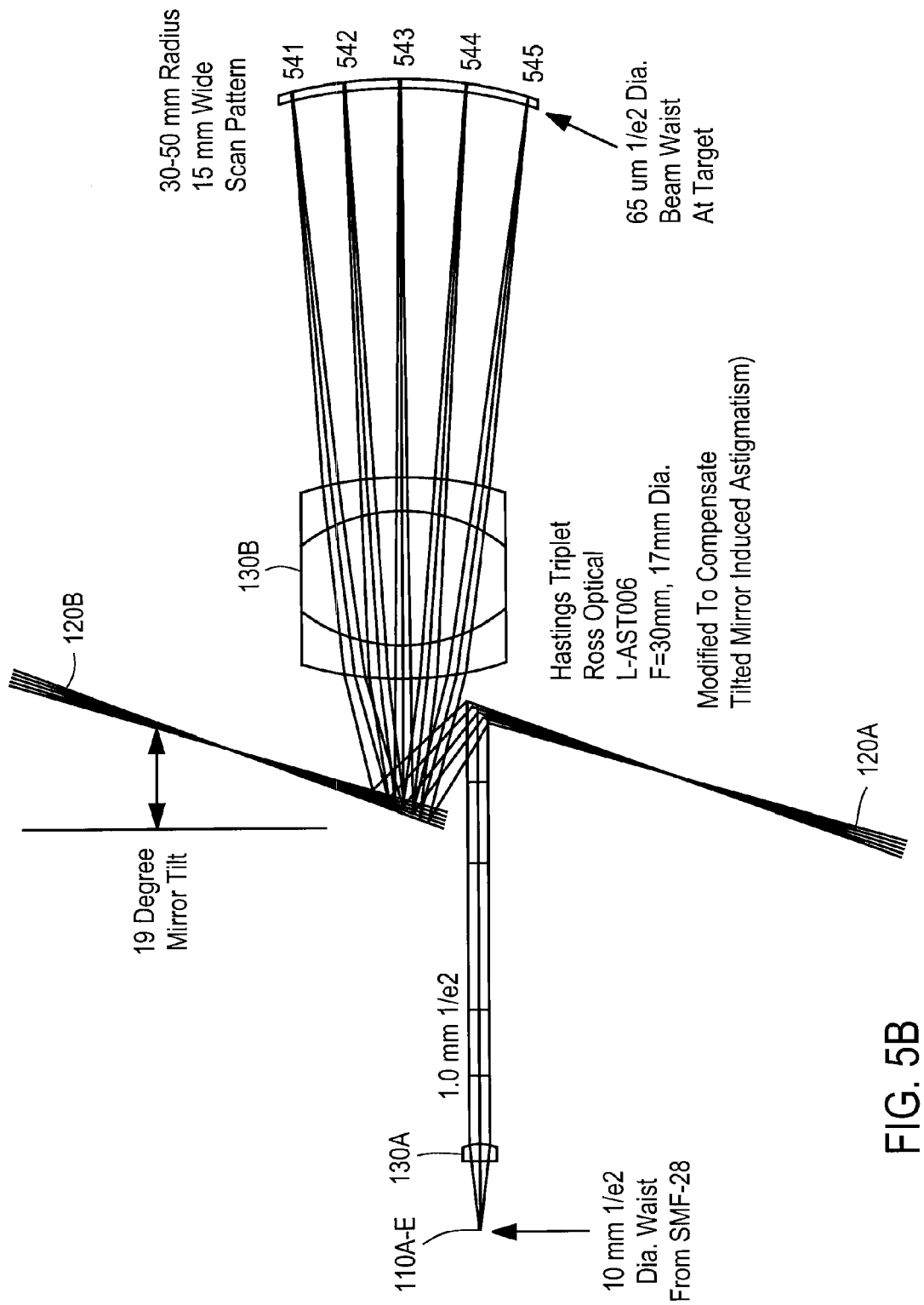
FIG. 5B is a ray trace through the pattern generator of FIG. 5A.

FIGS. 5A-5B illustrate a reflective design. In this example, the optical source is a fiber laser at a wavelength of 1535 nm. Collimation optics 130A collimate the incoming optical beam onto two reflective rotating scan disks 120A-120B, which are tilted at 19 degrees from normal. Each scan disk 120 is approximately 30-50 mm in diameter with 15-30 facets each. The facets typically extend roughly 5 mm in the tangential direction and slightly less than that in the radial direction. The incident optical beam is approximately 1.0-1.5 mm in diameter. The focusing optics 130B includes a triplet for focusing the deflected optical beam onto the target. FIGS. 5 show the optical beam at five different offsets 541-545. There are 15-30 offsets (one for each facet), that are evenly spaced approximately 0.75 mm apart, for a full target width of about 15 mm.

This particular example is designed for the medical application described in co-pending U.S. patent applications Ser. No. 10/367,582, "Method and Apparatus for Treating Skin Using Patterns of Optical Energy," filed on Feb. 14, 2003, and Ser. No. 60/486,304, "Method and Apparatus for Fractional Phototherapy of Skin," filed on Jul. 11, 2003, both of which are incorporated herein by reference. In this application, the optical scanner is swept over the skin. The scanning motion is in and out of the paper in FIG. 5. The actual scan line is short, typically 0.1 mm, and is used primarily to compensate for the sweeping motion. Alternate embodiments utilize scan lines less than 1 mm. As a result, the optical beam remains focused on a single point on the skin for the scan duration of a single facet. For further details concerning the motion compensation, see co-pending U.S. patent application Ser. No. 10/745,761, "Method And Apparatus for Monitoring and Controlling Laser-Induced Tissue Treatment," filed on Dec. 23, 2003 and incorporated herein by reference. When the next facet enters the optical beam, another treatment spot is generated at a different location. The disks 120 are designed to rotate up to 6000 rpm, resulting in a treatment rate of up to 3000 spots per second.

Figure 6:
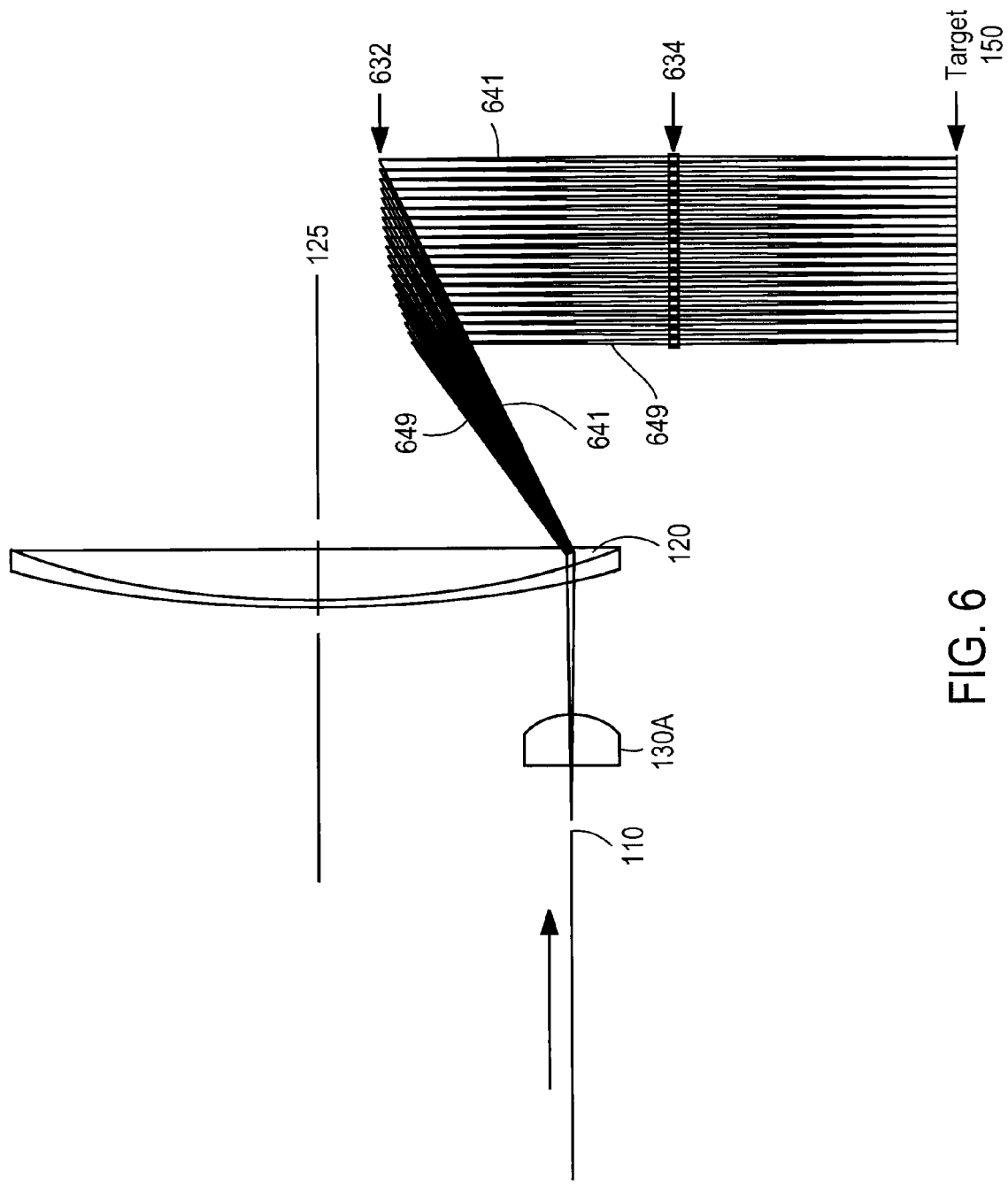
FIG. 6 is a ray trace through another pattern generator according to the invention.

FIG. 6 is an example of an optical pattern generator using one rotating optical element. The incoming optical beam arrives via an optical fiber 110 and is collimated by collimation optics 130A. The collimated beam is incident upon the rotating optical element 120. The optical element 120 is depicted as a lens in FIG. 6 in order to illustrate the offset function. In reality, the optical element 120 contains approximately 20 facets, each of which has an offset component that is implemented as a lens centered on the rotational axis 125. Each lens has a different power and deflects the incoming optical beam by a different amount. FIG. 6 shows all twenty of the deflected beams 641-649. The weakest lens generates the least deflected beam 641 and the strongest lens generates the most deflected beam 649. However, the different power lenses also introduce different amounts of focusing to each of the beams 641-649. In FIG. 2, this was counteracted by a second lens of equal but opposite power. In this example, an echelon type mirror array 632 is used to individually redirect each beam 641-649 to the target and a lens array 634 individually focuses each beam 641-649 on the target 150.

Although the description above contains many specifics, these should not be construed as limiting the scope of the invention but merely as illustrating different examples and aspects of the invention. For example, applications other than the medical application described above will be apparent, including a variety of laser materials processing applications, printing/copying, laser display systems and direct marking of materials. The specific design of the optical pattern generator will depend on the application. For example, the wavelength of the optical beams will depend in part on the application. Even just within dermatology, lasers having different wavelengths are used in different surgical applications. Examples of dermatology laser light sources include diode lasers, diode-pumped solid state lasers, Er:YAG lasers, Nd:YAG lasers, argon-ion lasers, He-Ne lasers, carbon dioxide lasers, excimer lasers, erbium fiber lasers, and ruby lasers. These devices generate laser beams having the wavelength in the visible range of the spectrum (0.4-0.7 µm) as well as in infrared (0.7-11 µm) and UV (0.18-0.40 µm) ranges. It should be noted that terms such as "optical" and "light" are meant to include all of these and other wavelength regions and not just the visible range of the spectrum.

Depending on the application, the figures generated can also take different forms. In many applications, a single continuous scan line is traced repeatedly. In some applications, a series of parallel scan lines is produced, laterally offset from each other. The scan lines can also be a series of points rather than a continuous line, for example if a source laser is pulsed on and off during scanning. As a final example, scanning can also be used to compensate for motion so that the scan spot remains in a fixed position on a target even though the scanning device is moved relative to the target. Other variations will be apparent.

As another example of different variations, the number of rotating optical elements 120 can also vary. The above examples (other than FIG. 6) all use a pair of scan disks but this is not a requirement. For example, two or more pairs of rotating optical elements can be used. As another example, the two-disk designs can be converted to three-disk designs by "splitting" one of the scan disks into two scan disks. In FIG. 3, the positive lens 320B can be split into two positive lenses with half the power, one placed upstream of the negative lens 320A and the other placed downstream of the negative lens 320A.

The basic pattern generator can also be used in many different applications. The rotating optical elements introduce a deflection to the optical axis of the overall system. If the facets include offset components, then the deflection includes an offset generally along a radial direction. If the facets include scan components, then the deflection includes a scan line, typically along a tangential direction. For example, a system that uses a 20 mm focal length objective lens with a 1 mm scan line will introduce a deflection of 0.05 radians. Different applications can use either or both of these, possibly in combination with other deflection mechanisms.

Figure 7A:
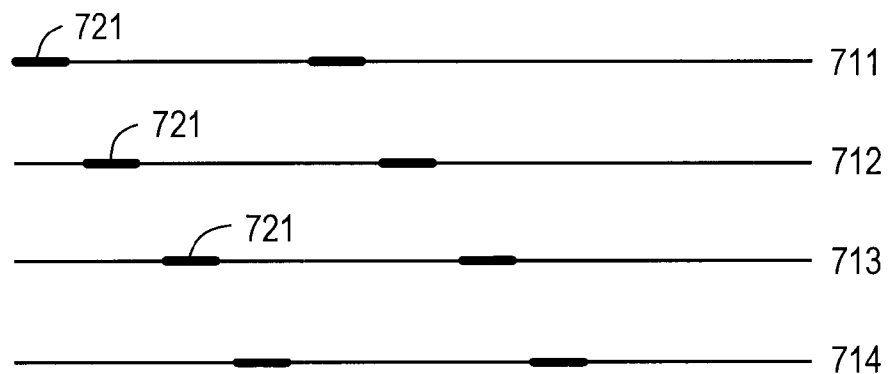
FIGS. 7A-7C are diagrams illustrating various patterns generated by systems using a pattern generator according to the invention.
Figure 7B:
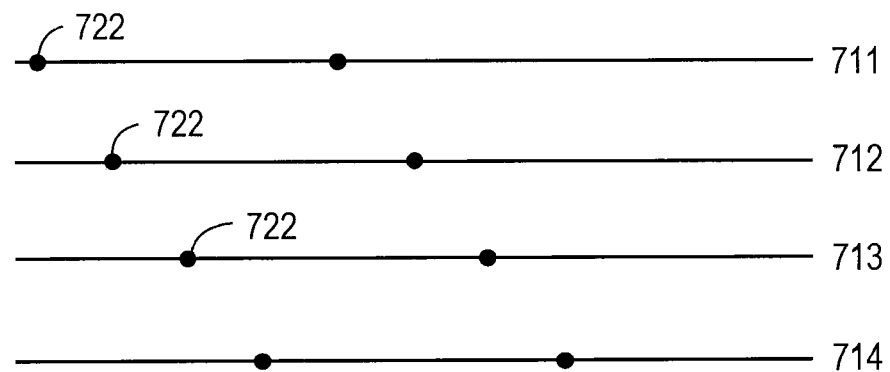
Figure 7C:
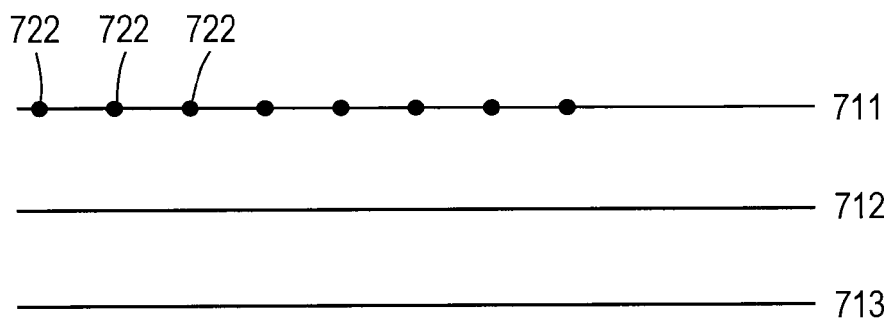

For example, FIGS. 7A-7C illustrate different patterns that can be generated by systems using a pattern generator. In FIG. 7A, the pattern generator is optically coupled to another scanning device, such as a conventional polygon scanner. The conventional scanning device alone would generate a scan line, such as 711. The pattern generator generates a pure offset (no scanning), as depicted by the offsets between the scan lines 711-714. The pattern generator operates at a much faster rate than the other scanning device. Thus, the set of offsets is cycled through multiple times in the time required for the conventional scanner to generate one scan line. The resulting pattern is a set of "dashes" 721 as shown in FIG. 7A. Each dash 721 corresponds to one facet (or set of corresponding facets) rotating through an incident optical beam.

In the example of FIG. 7B, the facets on the pattern generator also contain a scan component that counteracts the scan produced by the conventional scanning device. Thus, the dashes 721 in FIG. 7A are compressed into spots 722 in FIG. 7B. As each facet rotates through the incident optical beam, the scan component on the facet counteracts the conventional scanner, thus holding the optical beam at a fixed location. When the next facet rotates into place, the optical beam jumps to the next location, which in this example also includes a lateral offset.

In FIG. 7C, the pattern generator does not introduce a lateral offset. Rather, the scan components in the pattern generator counteract the conventional scanner generating a row 711 of spots 722. When the row is completed, an offset is introduced (e.g., by another conventional scanner) to generate a next row 712 of spots. In this way, a display can be built.

As a final example, the optical pattern generator can also be used in imaging or sensing systems. In one case, the object source is located at the focal plane of the scanner and the sensor (such as a CCD) is located at the opposite end of the scanner. For example, rather than using the scan components to compensate for the scanning from a conventional scanner, the scan components can be used to compensate for the motion of an object that is to be imaged. In effect, the scanning can be used for deblurring in the image capture. Application can be found in streak cameras.

Although the detailed description contains many specifics, these should not be construed as limiting the scope of the invention but merely as illustrating different examples and aspects of the invention. It should be appreciated that the scope of the invention includes other embodiments not discussed in detail above. Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents. Furthermore, no element, component or method step is intended to be dedicated to the public regardless of whether the element, component or method step is explicitly recited in the claims.

What is claimed is:

1. A method of compensating for relative motion between a target and an optical pattern generator, the optical pattern generator comprising a multi-faceted rotating optical element having a rotational axis and a plurality of facets that rotate around the rotational axis, the method comprising:
    moving an optical pattern generator in a lateral direction relative to the target;
    rotating a facet of the rotating optical element of the optical pattern generator through an incident optical beam; and
    generating a scan action from the deflection of the incident optical beam by the facet, wherein generation of the scan action compensates for motion of the optical pattern generator in a lateral direction relative to the target.

2. The method of claim 1, wherein moving an optical pattern generator in a lateral direction relative to the target comprises sweeping the optical pattern generator over the target.

3. The method of claim 1, wherein the scan action deflects the figure by a distance of less than 1 mm relative to the optical pattern generator.

4. The method of claim 1, wherein the target is a section of skin.

5. The method of claim 1, wherein the compensation for relative motion deflects the incident optical beam to a stationary spot on the target for a duration of the exposure of the spot.

6. An optical pattern generator that generates a plurality of figures on a target that is moving relative to the optical pattern generator, the pattern generator comprising:
    a first multi-sectored rotating optical element having a first rotational axis and a plurality of different sectors that rotate around the first rotational axis,
    wherein each sector deflects an incident optical beam that compensates for a motion of the target in a lateral direction relative to the optical pattern generator in generating a figure of the plurality of figures; and
    one or more sectors include an offset component that offsets the figure along an offset direction, wherein the offset direction is generally aligned with a radial direction of the optical element.

7. The pattern generator of claim 6 further comprising:
    a second multi-sectored rotating optical element having a second rotational axis and a plurality of different sectors that rotate around the second rotational axis,
    the second optical element located downstream of the first optical element,
    wherein each sector on the first optical element has a corresponding sector on the second optical element, and
    corresponding sectors rotate through the optical beam in synchronization and cause the optical beam to generate a figure from the plurality of figures as the corresponding sectors rotate through the optical beam.

8. The pattern generator of claim 6 further comprising:
    a handpiece functionally coupled to the first multi-sectored rotating optical element and configured to deliver optical treatment energy to a selected region of skin.

9. The pattern generator of claim 8 further comprising a curved contact plate configured to be placed in contact with the selected region of skin during operation of the pattern generator.

10. The pattern generator of claim 6 wherein the figures in the plurality of figures are offset by uneven amounts.

11. The pattern generator of claim 6 wherein the figures are generated in a non-sequential order.

12. The pattern generator of claim 6 wherein each offset component comprises a lens-like optical element, and optical powers of the lens-like optical elements vary from sector to sector whereby different sectors introduce different offsets.

13. The pattern generator of claim 6 wherein each of the figures is stationary on the target during exposure of the figure.

14. The pattern generator of claim 6 wherein the figures in the plurality of figures are offset along a direction that is perpendicular to a direction of relative motion of the target relative to the optical pattern generator.

* * * * *